E. G. JOHANSON.
LAMP LENS.
APPLICATION FILED MAY 26, 1916.
1,198,848. Patented Sept. 19, 1916.
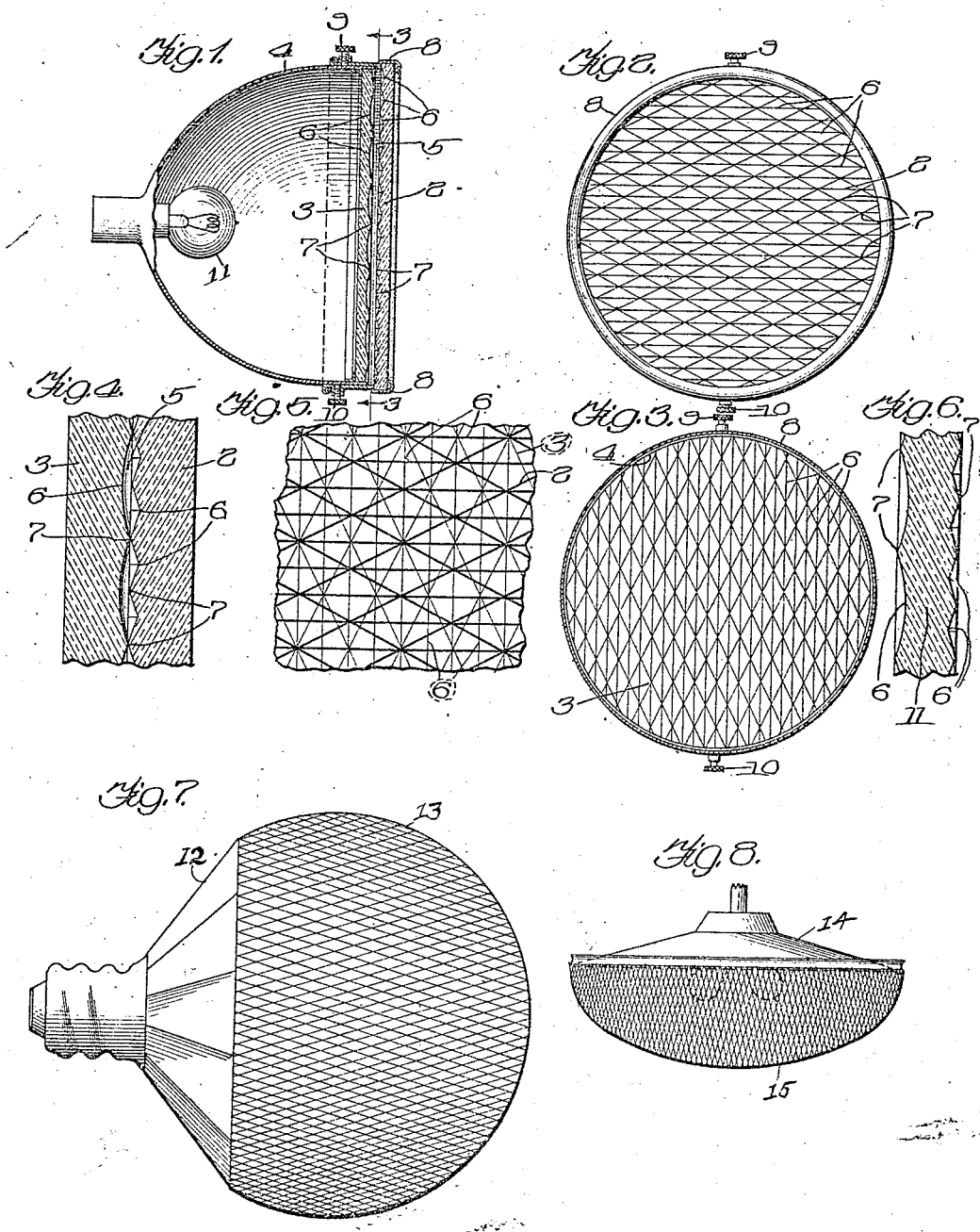

UNITED STATES PATENT OFFICE.

EMIL G. JOHANSON, OF CHICAGO, ILLINOIS.

LAMP-LENS.

1,198,848.  Specification of Letters Patent.  Patented Sept. 19, 1916.

Application filed May 26, 1916. Serial No. 99,941.

*To all whom it may concern:*

Be it known that I, EMIL G. JOHANSON, a subject of the King of Sweden, residing at Chicago, in the county of Cook and State of Illinois, have invented certain new and useful Improvements in Lamp-Lenses, of which the following is a specification.

My invention relates to glazing for headlights, windows, partitions, and the like, where it is desired to transmit light and at the same time prevent transmission of images.

The object of the invention is to in an improved manner increase the surface or surfaces of reflection within a given area of lens to gather an increased number of the rays thrown out by the source of light, and thereby enlarge the volume of light passing through the lens or its equivalent intervening medium.

Another object of the invention is to accomplish the foregoing and at the same time eliminate the blinding intensity of powerful direct rays of light and substitute a large volume of light in the form of a soft and agreeable glow.

I accomplish these general objects by means of a lens composed of a large number of small individual lenses angularly arranged relative to each other, and formed by making peculiarly formed and arranged indentations or cuttings in the surface or surfaces of the parent lens.

This invention also includes a combination of several thus indented lenses having their respective lens formations arranged at right angles, or other degrees of angles, relative to each other, and arranged either facing each other to make one lens with a smooth exterior on all sides or two spaced apart lenses to vary the contact points of incidence and reflection.

This invention consists in the novel construction, combination and arrangement of parts, all as hereinafter described in detail, illustrated in the accompanying drawing, and incorporated in the appended claim.

In the drawing—Figure 1 represents a section through a headlight equipped with a composite lens, or a pair of lenses, embodying my invention, together with means for adjusting the two disks or lenses toward or from each other. Fig. 2 is a face view of Fig. 1. Fig. 3 is a face view with the outer disk or lens removed, and is substantially a section taken on line 3—3 of Fig. 1. Fig. 4 is a cross section of an enlarged fragment of the double or composite lens shown in Fig. 1. Fig. 5 is a face view of a similar broken away and enlarged lens portion, the heavier lines indicating the outlines of the small lens indentations of the outer disk and the lighter lines the corresponding indentations in the inner disk. Fig. 6 is a modification wherein a single disk carries the two arrangements of indentations shown in Figs. 1, 4 and 5. Figs. 7 and 8 are two different modifications of my improved lens in the form of a bulb instead of the flat form shown in the remaining views.

In the arrangement shown, the individual indentations are in each instance of diamond shape outlines which produces pyramidal elevations and rhomboidal depressions. The outer lens is designated by the numeral 2 and the inner one by the numeral 3. In Fig. 1 these two lenses are held in their proper relation on a lamp casing 4 and spaced apart to provide an air space 5. The diamond-form depressions are identified by the numeral 6 and the resultant pyramidal elevations by the numeral 7. Means for adjusting one disk or lens relative to the other disk or lens are provided in a ring or rim 8 carrying the outer lens which frictionally engages the casing 4, as shown, and is provided with a pair of set screws 9 and 10 having threaded engagement with the ring or band 8 and bearing against the casing 4. By loosening the set screws 9 and 10 the ring or band 8, which is the individual casing for the outer lens, may be rotatably adjusted relative to the inner lens which is suitably secured within the casing 4, or the outer lens moved either toward or from the inner lens.

Assuming the relation of the lenses 2 and 3 in Fig. 1 to be a fixed one and the lenses with their indented surfaces placed opposite each other as in Fig. 4, the exterior faces of the composite lens will be smooth and easily cleaned, while the indented faces will be protected when suitably secured together, against the entrance of dust, moisture, or any foreign substance tending to dim the reflector surfaces 6 and 7. The same result may be attained with the relatively movable relation shown in Fig. 1 by means of a well made, or close fitting, construction.

In Fig. 1 11 represents a small electric lamp. The rays of light diverging from this lamp and impinging against the curves or angles of the depressions 6 will cross each other, the rays from one side or end of each depression being deflected across the path of the rays deflected from the other side or end of each such depression. This breaks up the intensity and sharply piercing penetration of the direct rays without diminishing the volume of their light. As these deflected rays from the inner lens meet the lens configurations on the inner face of the outer lens, they are again deflected or broken up, which is true also of the Fig. 6 construction which, however lacks the feature of adjustability shown in Fig. 1. Of course the distance apart of the small lens surfaces will vary the points of contact therewith of the rays cast from the inner lens and make possible an infinite variety of modifications, the technical details of which will be obvious to those skilled in this art.

In Fig. 7 a shade form of casing 12 has mounted thereon a three quarter sphere form of bulb and in Fig. 8 a flatter form of casing 14 has thereon a quarter globe bulb 15 adapted for either of the forms of lens construction shown in Figs. 1 to 6.

Having thus described my invention, I claim as new and desire to secure by Letters Patent—

The combination with a lamp casing, of a lens disk having a series of diamond shaped depressions in its outer face, a similar lens movably mounted opposite said first mentioned lens with its depressions facing said first mentioned lens, and means for relatively adjusting said lenses revolubly or parallel to each other.

In testimony whereof I have hereunto subscribed my name.

EMIL G. JOHANSON.

Copies of this patent may be obtained for five cents each, by addressing the "Commissioner of Patents, Washington, D. C."